(12) United States Patent
Kim et al.

(10) Patent No.: US 9,672,799 B1
(45) Date of Patent: Jun. 6, 2017

(54) MUSIC PRACTICE FEEDBACK SYSTEM, METHOD, AND RECORDING MEDIUM

(71) Applicant: International Business Machines Corporation, Armonk, NY (US)

(72) Inventors: Minkyong Kim, Scarsdale, NY (US); Clifford A. Pickover, Yorktown Heights, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/985,160

(22) Filed: Dec. 30, 2015

(51) Int. Cl.
- *G09B 15/00* (2006.01)
- *G09B 15/02* (2006.01)
- *G10H 1/00* (2006.01)
- *G10G 1/00* (2006.01)

(52) U.S. Cl.
CPC ............ *G10G 1/00* (2013.01); *G09B 15/00* (2013.01); *G10H 2220/015* (2013.01); *G10H 2220/091* (2013.01)

(58) Field of Classification Search
CPC .... G10G 1/00; G09B 15/00; G10H 2220/015; G10H 2220/091
See application file for complete search history.

(56) References Cited

U.S. PATENT DOCUMENTS

| | | | | |
|---|---|---|---|---|
| 6,156,964 A * | 12/2000 | Sahai | ........... | G09B 15/04 84/470 R |
| 6,348,648 B1 * | 2/2002 | Connick, Jr. | ........ | G09B 15/023 84/477 R |
| 6,660,922 B1 * | 12/2003 | Roeder | ........... | G09B 15/00 84/470 R |
| 6,686,531 B1 * | 2/2004 | Pennock | ........... | G10H 1/0058 84/612 |
| 7,166,792 B2 | 1/2007 | Hiratsuka et al. | | |
| 7,482,529 B1 * | 1/2009 | Flamini | ........... | G10H 1/0008 84/609 |
| 7,939,740 B2 * | 5/2011 | Usa | ........... | G10H 1/0008 84/600 |
| 7,947,889 B2 * | 5/2011 | Usa | ........... | G10H 1/0008 84/615 |
| 7,989,689 B2 * | 8/2011 | Sitrick | ........... | G09B 15/023 84/477 R |

(Continued)

FOREIGN PATENT DOCUMENTS

WO    WO 2015/093738    6/2015

OTHER PUBLICATIONS

Chee et al., "Intelligent learning environment: building hybrid system from standard application and Web application." Advanced Learning Technologies, 2005.

(Continued)

*Primary Examiner* — Jeffrey Donels
(74) *Attorney, Agent, or Firm* — Alexa L. Ashworth, Esq.; McGinn IP Law Group, PLLC

(57) ABSTRACT

A music practice feedback method, system, and non-transitory computer readable medium including a displaying device configured to display sheet music, a collecting device configured to collect information related to a playing of the sheet music by a plurality of players, and a display changing device configured to change a display of the sheet music based on said collected information.

20 Claims, 5 Drawing Sheets

(56) References Cited

U.S. PATENT DOCUMENTS

| | | | |
|---|---|---|---|
| 9,202,448 B2 | 12/2015 | Morell et al. | |
| 9,280,960 B1* | 3/2016 | Clarke | G10H 7/00 |
| 2004/0055441 A1* | 3/2004 | Katsuta | G09B 15/00 |
| | | | 84/470 R |
| 2004/0221707 A1* | 11/2004 | Hiratsuka | G10H 1/0008 |
| | | | 84/478 |
| 2005/0016368 A1* | 1/2005 | Perla | G09B 15/00 |
| | | | 84/723 |
| 2005/0255914 A1* | 11/2005 | McHale | A63F 13/10 |
| | | | 463/31 |
| 2006/0009979 A1* | 1/2006 | McHale | A63F 13/10 |
| | | | 704/270 |
| 2006/0117935 A1* | 6/2006 | Sitrick | G09B 15/023 |
| | | | 84/477 R |
| 2007/0022866 A1* | 2/2007 | Perla | G09B 15/00 |
| | | | 84/609 |
| 2007/0256543 A1* | 11/2007 | Evans | G09B 5/04 |
| | | | 84/609 |
| 2010/0089221 A1* | 4/2010 | Miller | G09B 15/023 |
| | | | 84/470 R |
| 2010/0218098 A1* | 8/2010 | Sitrick | G09B 15/002 |
| | | | 715/719 |
| 2011/0132172 A1* | 6/2011 | Gueneux | G10G 1/00 |
| | | | 84/454 |
| 2011/0283866 A1* | 11/2011 | Hogan | G09B 15/003 |
| | | | 84/470 R |
| 2014/0033899 A1* | 2/2014 | Dripps | G09B 5/06 |
| | | | 84/483.1 |
| 2014/0366709 A1* | 12/2014 | Uemura | G10H 1/0025 |
| | | | 84/603 |
| 2015/0059558 A1* | 3/2015 | Morell | G10H 1/0025 |
| | | | 84/609 |
| 2015/0095822 A1* | 4/2015 | Feis | G10G 1/00 |
| | | | 715/765 |
| 2015/0262500 A1* | 9/2015 | Hardaway | G09B 15/00 |
| | | | 84/483.2 |
| 2015/0268847 A1* | 9/2015 | Lane | G06F 3/04847 |
| | | | 715/716 |

OTHER PUBLICATIONS

Reid et al., "Developing multimedia materials for creating ensemble." Journal of Technology in Music Learning 1.1 (2001): 47-55.

Olmos et al. "A High-Fidelity Orchestra Simulator for Individual Musicians' Practice." Computer Music Journal 36.2 (2012): 55-73.

Yin et al., "Digital violin tutor: an integrated system for beginning violin learners." Proceedings of the 13th annual ACM international conference on Multimedia. ACM, 2005.

Dannenberg et al. "Results from the piano tutor project." Proceedings of the Fourth Biennial Arts and Technology Symposium. 1993.

\* cited by examiner

MUSIC PRACTICE FEEDBACK SYSTEM, METHOD, AND RECORDING MEDIUM

BACKGROUND

The present invention relates generally to a music practice feedback system, and more particularly, but not by way of limitation, to a music practice feedback system for changing a visualization of sheet music based on collecting of information related to the playing of regions of the sheet music.

Conventional techniques for visualization of music and other sounds use note extraction. The conventional techniques may label the twelve notes of an octave around a circle. Raw audio information is fed into the system, whereby the system applies note extraction techniques to isolate the musical notes in a particular passage. The intervals between the notes are then visualized by displaying a line between the labels corresponding to the note labels on the circle. Further, the lines representing the intervals are color coded with a different color for each of the six intervals. Also, the music and other sounds are visualized upon a helix that allows an indication of absolute frequency to be displayed for each note or sound. However, these conventional techniques merely label parts of the music without identifying any other information about the regions.

Other conventional techniques accelerate conceptual comprehension in learning and technical proficiency in performing a musical piece or lesson by identifying performance issues with particular musical concepts. Based on this identification, customized lessons are created that focus on the improvement of these specific musical concepts. Thus, through the iteration, a series of lessons is dynamically generated based specifically on the user's performance. However, this technique only generates lessons for complex musical concepts and it not directed towards actual musical pieces. Therefore, although the techniques attempt to teach users complex musical concepts, the complex musical concepts are artificially generated and not necessary included in sheet music as the same concept.

Thus, there is a technical problem in the conventional techniques that the techniques are incapable of providing a music practice feedback system that can identify difficult regions of sheet music based on a collection of information such that the users can focus their practice on these difficult areas without the need for a teacher.

SUMMARY

In an exemplary embodiment, the present invention can provide a music practice feedback system, including a displaying device configured to display sheet music, a collecting device configured to collect information related to a playing of the sheet music by a plurality of players, and a display changing device configured to change a display of the sheet music based on said collected information.

Further, in another exemplary embodiment, the present invention can provide a non-transitory computer-readable recording medium recording a music practice feedback program, the program causing a computer to perform: displaying sheet music, collecting info nation related to a playing of the sheet music by a plurality of players, and changing a display of the sheet music based on said collected information.

Even further, in another exemplary embodiment, the present invention can provide a music practice feedback method, including displaying sheet music, collecting information related to a playing of the sheet music by a plurality of players, and changing a display of the sheet music based on said collected information.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
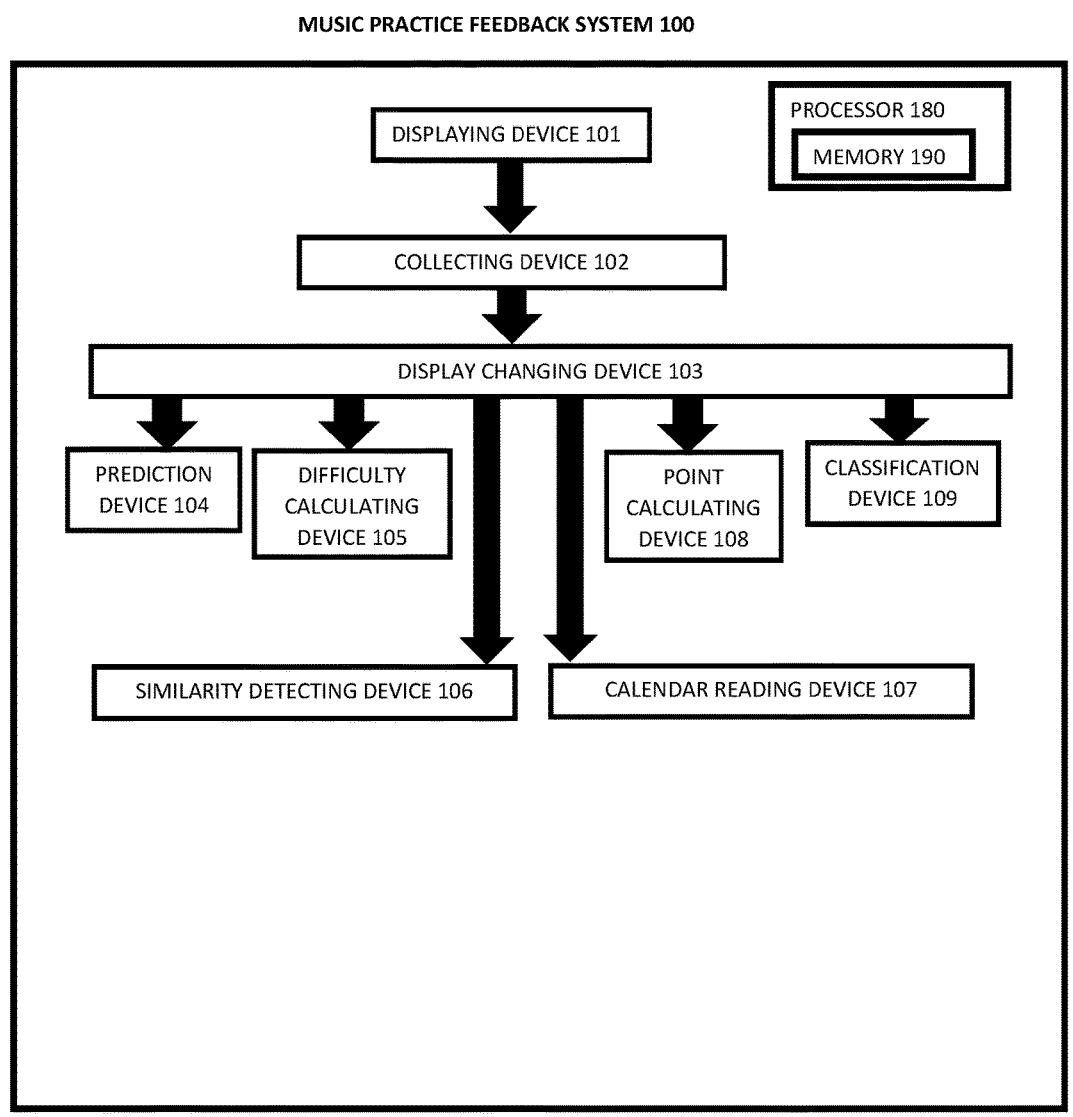
FIG. 1 exemplarily shows a block diagram illustrating a configuration of a music practice feedback system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the music practice feedback system 100 includes a displaying device 101, a collecting device 102, a display changing device 103, a prediction device 104, a difficulty calculating device 105, a similarity detection device 106, a calendar reading device 107, a point calculating device 108, and a classification device 109. The music practice feedback system 100 includes a processor 180 and a memory 190, with the memory 190 storing instructions to cause the processor 180 to execute each device of music practice feedback system 100.

Although the music practice feedback system 100 includes various devices, it should be noted that a music practice feedback system can include modules in which the memory 190 stores instructions to cause the processor 180 to execute each module of music practice feedback system 100.

With the use of these various devices, the music practice feedback system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 3:
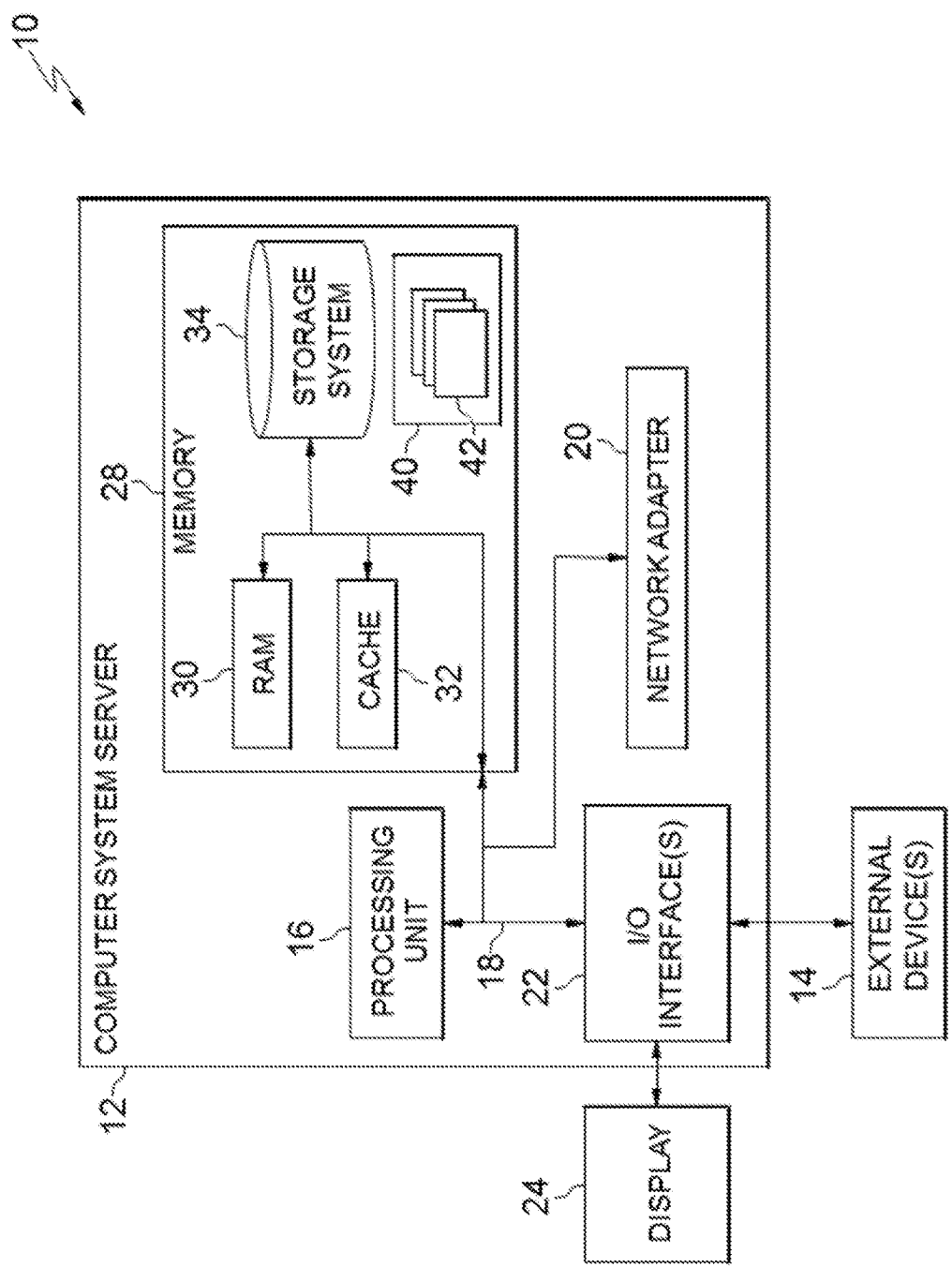
FIG. 3 depicts a cloud computing node according to an embodiment of the present invention.
Figure 4:
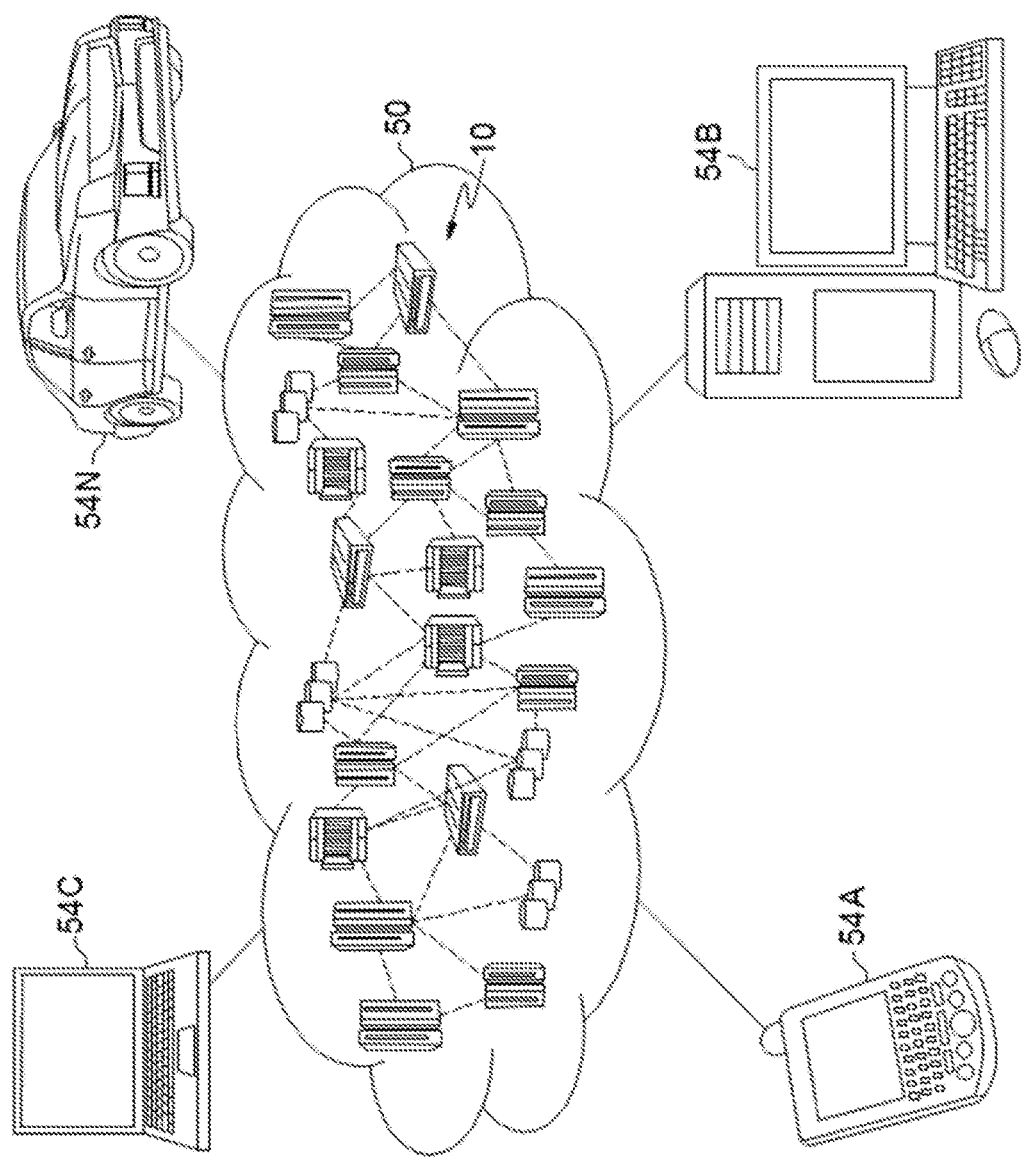
FIG. 4 depicts a cloud computing environment according to another embodiment of the present invention.
Figure 5:
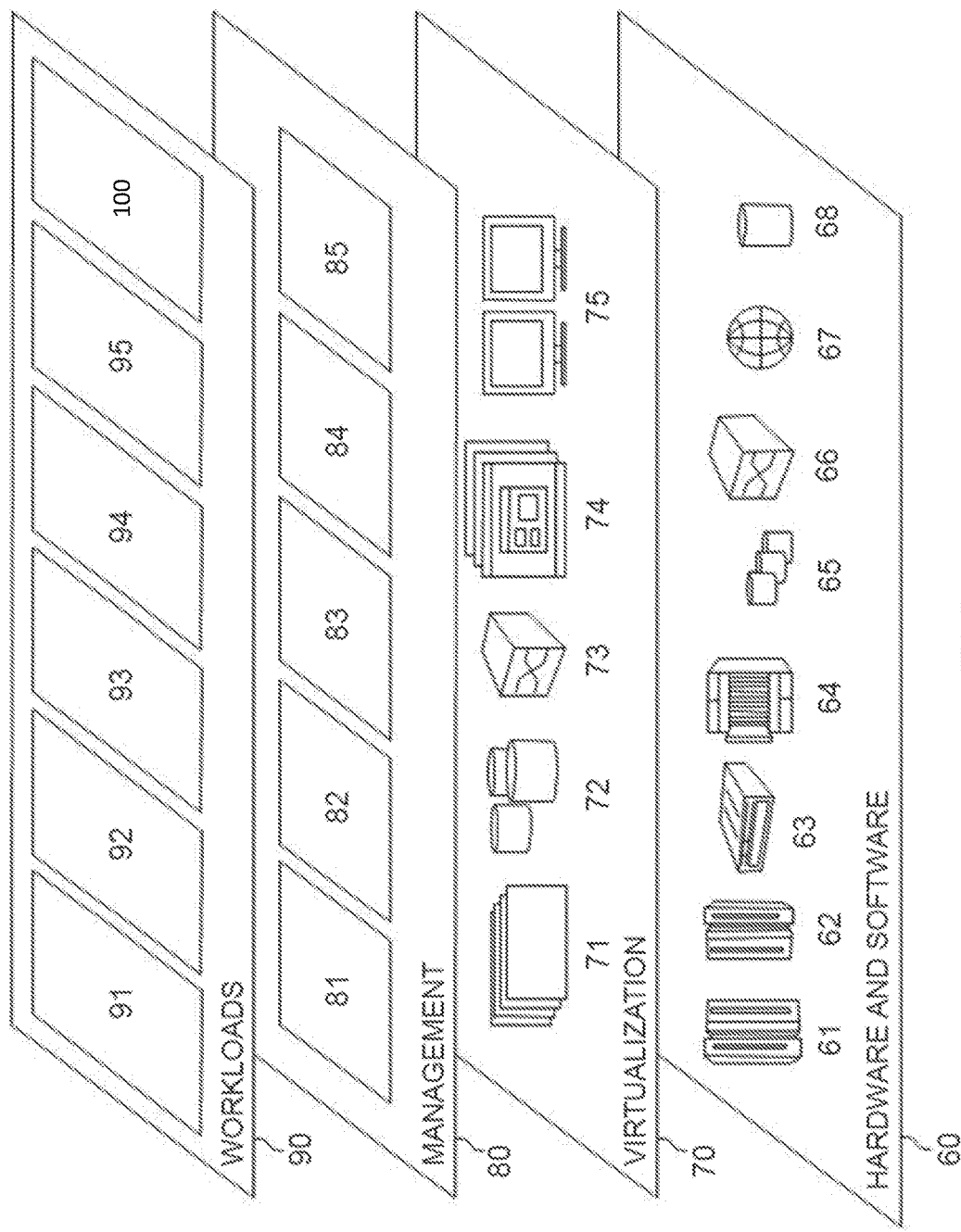
FIG. 5 depicts abstraction model layers according to an embodiment of the present invention.

Although as shown in FIGS. 3-5 and as described later, the computer system/server 12 is exemplarily shown in cloud computing node 10 as a general-purpose computing device which may execute in a layer the music practice feedback system 100 (FIG. 5), it is noted that the present invention can be implemented outside of the cloud environment.

The displaying device 101 displays sheet music that is split into regions. The regions include sections of the sheet music based on any one of time to play, difficulty, part of the sheet music, etc.

It is noted that the term "sheet music" is not limited to an actual piece of paper including music but includes any musical representation that can be read by a user and displayed. Accordingly, the displaying device 101 is configured to display music in any form that is able to be read and practiced by an individual The collecting device 102 collects information related to the playing of regions of the sheet music. The collecting device 102 collects the information and pairs it to a particular regions. The information can be for a single musician, or, more preferably for a plurality of musicians (i.e., cohorts of musicians/players).

The information can include difficulties that an individual or crowd have with certain regions of the sheet music (or that are predicted to have), difficulties that cohorts of players have with certain regions of the sheet music, a measure of playing improvement of the user of the system 100, a measure of playing decline of the user of the system 100 (e.g., "decay" through time), information on a region in which creativity injection (e.g., improvisation) is useful, and a measure of an emotional response to a region, etc.

The cohorts of players relates to, for example, people of certain ages and geographies, people with certain finger lengths, people with different experiences and educational levels, people with certain disease states (e.g. Parkinson's, Alzheimer's, Dystonia, Carpal Tunnel Syndrome), etc.

The information also can include a determination factor of musical playing quality which takes into consideration timing and frequency or missing of the correct notes. The determination factor includes in the information collected by the collection device 102 may involve computation of a multidimensional decay surface signifying different decay rates for different classes of playing characteristics. As an example, for different songs and regions of the score, a user's ability to retain playing skills may decay at different rates, and a forecast may be made and/or learned via machine learning.

Based on the determination factor included in the information, a skill decay curve, and on the measured level of skill and achievement for a given sheet music, training help can be generated. For example, a student can be prompted to practice difficult regions, and then directed to practice remaining regions of the sheet music. Additionally, a student might be prompted to practice, for example, 5-10 mins a segment he is having difficulty with outside of the regular practice period to improve overall progress with the sheet music.

The display changing device 103 changes the visual display of the regions of the sheet music based on the information collected by the collecting device 102. The visualization change can be any change such that it draws the user's attention thereto in order to increase the user's practice rate of the region. Typically, the display changing device 103 changes the display of a region based on the difficulty of the region as determined from the collected information. However, the display changing device 103 can change the display of a region of the sheet music based on any set of collected information.

That is, teachers typically teach students to practice the challenging parts first before start practicing the entire piece. This would be an example of a reason for parents to seek an experienced teacher. However, based on the analysis of the how well students play certain parts of a piece, the display device 103 can automatically identify challenging regions and highlight (or use other visualization mechanisms to draw attention to) those regions.

The prediction device 104 predicts a user's advancement or decline based on how much the user practices the regions that have been displayed differently by the display changing device 103. For example, the prediction device 104 can make a localized prediction (i.e., player decline or advancement) based on playing by one or more individuals (e.g. a region in which additional practice is likely to be needed after time T=1 week, 2 weeks, and 1 month).

The difficultly calculating device 105 calculates a "difficulty" or a measure of student error of a particular region of the sheet music based on a distance of a student performance from a target playing (including incorrect notes, pitches, rhythms, vibrato, etc). The display changing device 103 can change the display when the difficulty calculating device 105 calculates that the difficulty of the region is greater than a predetermined threshold. For example, if 90% of students have errors in a region of music as calculated by the difficultly calculating device 105, the display device 103 changes the display of that region.

The similarity detecting device 106 detects a similarity with the current user's playstyle to other users in the cohorts of players. For example, difficulties in regions of the sheet music may be used to aid in the assessment of possible diseases and their decline pathways (e.g. Parkinson's, Alzheimer's, Dystonia, Carpal Tunnel Syndrome) based on a similarity between the current user and other users with the particular diseases.

A bidirectional feed from an electronic calendar be used to assess fatigue, musical workout routines, etc., and be used to shape target curves (e.g. musical scores) and also schedule future musical workouts by the calendar reading device 107. The calendar reading device 107 facilitates planning, schedules, being easier on the student when a schedule is packed with activities, etc.

The point calculating device 108 rewards and incentives (e.g. calculate "points," accesses to more sheets of music, access to special or restricted functions) may be provided by "the crowd" (e.g., live listeners), by the system 100, by a social network, etc.

The classification device 109 classifies the user into a specific group of users based on their playstyle. For example, the classification device 109 can automatically classify a user into a geographical region, an age bracket, a skill level, etc. The classifications can be used to compare the groups with each other to find differences in each group. For example, potentially 16 to 20 year olds have great difficulty with a particular region but 80-year-olds play the particular region with ease. This data can be used by an external source to determine patterns.

In conjunction with the music practice feedback system 100, various input methods (such as microphone) on devices can be used to capture the sound of playing instruments. Alternatively, electronic instruments with MIDI (Musical Instrument Digital Interface) and related interfaces can be used for many classes of musical instruments. Also, the user optionally provides various information to tailor the music practice feedback system 100 to his/her needs, and/or the music practice feedback system 100 may be determine some of these aspects in an automatic manner, with a certain degree of confidence. The example information that a user can provide includes age, how many year he/she has been playing, type of instrument, typical duration and frequency of practice, and other cohort information including geographies (e.g. Korea, China, New York, etc.), experience levels, cognitive characteristics (e.g. a person who is easily distracted, who practices for a certain amount of time and appears to enjoy it, various characteristics based on facial expression analysis, etc.), etc. Also, existing basic components can be leveraged in analyzing the input data. For example, the system uses metronome for rhythm and tuner for pitch. The music practice feedback system 100 analyze the difference between what is supposed to sound like based on the music score versus how the person is playing or how the cohorts of people played the music piece.

In one embodiment, the music practice feedback system 100 can automatically monitor the outcomes of music practice, and based on such outcomes, the system can offered suggestions for teachers, practicing, etc. In one embodiment, the process may involve automated measures of work product (musical output) complexity, difficulty and quality, along with assessments of an expertise/proficiency level that has been attained in order to produce the work product (musical output). For example, for playing certain pieces, there are specific mathematical measures that characterize work product (musical output) quality and sophistication, and thus the system can make an assessment of the music made by a user in various automated manners.

Figure 2:
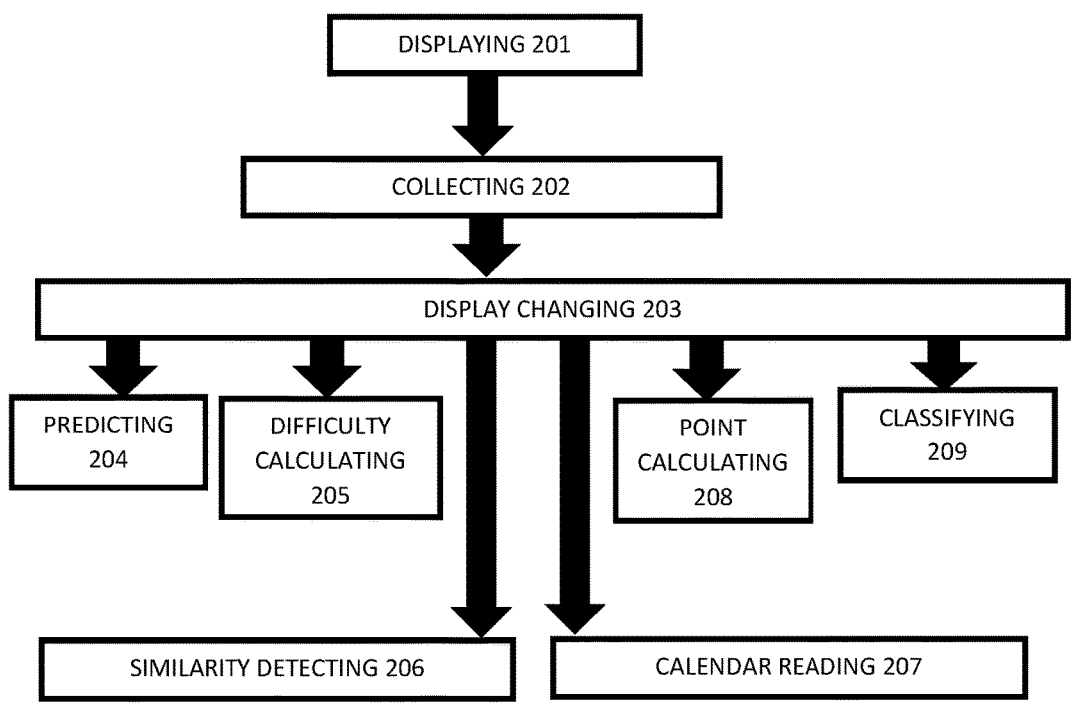
FIG. 2 exemplarily shows a high level flow chart for a music practice feedback method.

FIG. 2 shows a high level flow chart for a method 200 of music practice feedback.

Step 201 displays sheet music.

Step 202 collects information related to the playing of regions of the sheet music displayed in Step 201.

Step 203 changes the visual display of the regions of the sheet music based on the information collected by step 202.

Step 204 predicts a user's advancement or decline based on how much the user practices the regions that have been displayed differently by step 203.

Step 205 calculates a "difficulty" or a measure of student error of a particular region of the sheet music based on a distance of a student performance from a target playing (including incorrect notes, pitches, rhythms, vibrato, etc).

Step 206 detects a similarity with the current user's playstyle to other users in the cohorts of players.

Step 207 uses a bidirectional feed from an electronic calendar to assess fatigue, musical workout routines, etc., and to shape target curves (e.g. musical scores) and also schedule future musical workouts.

Step 208 rewards and incentives (e.g. calculate "points," accesses to more sheets of music, access to special or restricted functions) based on "the crowd" (e.g., live listeners), by the system 100, by a social network, etc.

Step 209 classifies the user into a specific group of users based on their playstyle.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created, using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the music practice feedback system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A music practice feedback system, comprising:
    a displaying device configured to display sheet music;
    a collecting device configured to collect information related to a playing of the sheet music by a plurality of players; and
    a display changing device configured to change a visual display of the sheet music based on said collected information.

2. The system of claim 1, wherein the sheet music includes a plurality of regions, and
    wherein the display changing device changes the display of a specific region based on the collected information.

3. The system of claim 1, wherein the collected information includes at least one of:
    difficulties that a user of users have with a region of the sheet music,
    difficulties that plurality of players have with regions of the sheet music;
    a measure of playing improvement of the user;
    a measure of playing decline of the user;
    a region of the sheet music for a creativity injection; and
    a measure of an emotional response to a region.

4. The system of claim 1, further comprising a prediction device configured to predict a user's advancement or decline of the playing of the sheet music based on how much the user practices a region of the sheet music in which the display has been changed by the display device.

5. The system of claim 1, further comprising a difficulty calculating device configured to calculate a difficulty of the playing of the sheet music for a particular region of the sheet music based on a distance of a user error from a correct playing of the sheet music.

6. The system of claim 1, further comprising a similarity detection device configured to detect a similarity between a playstyle of a user and the plurality of players.

7. The system of claim 1, further comprising a calendar reading device configured to:

use a bidirectional feed from an electronic calendar to assess at least one of a fatigue of a user as a result of playing the sheet music and musical workout routines performed by the user; and to shape target curves for the user by scheduling future musical workouts on the electronic calendar.

8. The system of claim 1, further comprising a point calculating device configured to calculate points indicating a success of the playing of the sheet music based on external inputs from social media.

9. The system of claim 1, further comprising a classification device configured to classify a user into a specific group of users based on a playstyle of the user while playing the sheet music.

10. The system of claim 1, further comprising:
a prediction device configured to predict a user's advancement or decline of the playing of the sheet music based on how much the user practices a region of the sheet music in which the display has been changed by the display device;
a difficulty calculating device configured to calculate a difficulty of the playing of the sheet music for a particular region of the sheet music based on a distance of a user error from a correct playing of the sheet music;
a similarity detection device configured to detect a similarity between a playstyle of a user and the plurality of players;
a calendar reading device configured to:
use a bidirectional feed from an electronic calendar to assess at least one of a fatigue of a user as a result of playing the sheet music and musical workout routines performed by the user; and
to shape target curves for the user by scheduling future musical workouts on the electronic calendar;
a point calculating device configured to calculate points indicating a success of the playing of the sheet music based on external inputs from social media; and
a classification device configured to classify a user into a specific group of users based on a playstyle of the user while playing the sheet music.

11. A non-transitory computer-readable recording medium recording a music practice feedback program, the program causing a computer to perform:
displaying sheet music;
collecting information related to a playing of the sheet music by a plurality of players; and
changing a visual display of the sheet music based on said collected information.

12. The non-transitory computer-readable recording medium of claim 11, wherein the sheet music includes a plurality of regions, and
wherein the changing changes the display of a specific region based on the collected information.

13. The non-transitory computer-readable recording medium of claim 11, wherein the collected information includes at least one of:
difficulties that a user of users have with a region of the sheet music,
difficulties that plurality of players have with regions of the sheet music;
a measure of playing improvement of the user;
a measure of playing decline of the user;
a region of the sheet music for a creativity injection; and
a measure of an emotional response to a region.

14. The non-transitory computer-readable recording medium of claim 11, further comprising predicting a user's advancement or decline of the playing of the sheet music based on how much the user practices a region of the sheet music in which the display has been changed by the changing.

15. The non-transitory computer-readable recording medium of claim 11, further comprising calculating a difficulty of the playing of the sheet music for a particular region of the sheet music based on a distance of a user error from a correct playing of the sheet music.

16. The non-transitory computer-readable recording medium of claim 11, further comprising detecting a similarity between a playstyle of a user and the plurality of players.

17. The non-transitory computer-readable recording medium of claim 11, further comprising:
using a bidirectional feed from an electronic calendar to assess at least one of a fatigue of a user as a result of playing the sheet music and musical workout routines performed by the user; and
shaping target curves for the user by scheduling future musical workouts on the electronic calendar.

18. The non-transitory computer-readable recording medium of claim 11, further comprising calculating points indicating a success of the playing of the sheet music based on external inputs from social media.

19. The non-transitory computer-readable recording medium of claim 11, further comprising classifying a user into a specific group of users based on a playstyle of the user while playing the sheet music.

20. A music practice feedback method, comprising:
displaying sheet music;
collecting information related to a playing of the sheet music by a plurality of players; and
changing a visual display of the sheet music based on said collected information.

* * * * *